INVENTOR.
ARCHER W. RICHARDS
ATTORNEYS

March 4, 1958 A. W. RICHARDS 2,825,246
TWO-SPEED BICYCLE TRANSMISSION
Filed April 7, 1954 4 Sheets-Sheet 2

INVENTOR.
ARCHER W. RICHARDS
ATTORNEYS

March 4, 1958

A. W. RICHARDS 2,825,246

TWO-SPEED BICYCLE TRANSMISSION

Filed April 7, 1954

INVENTOR.
ARCHER W. RICHARDS
BY Hudson, Boughton,
Williams, David & Hoffmann
ATTORNEYS

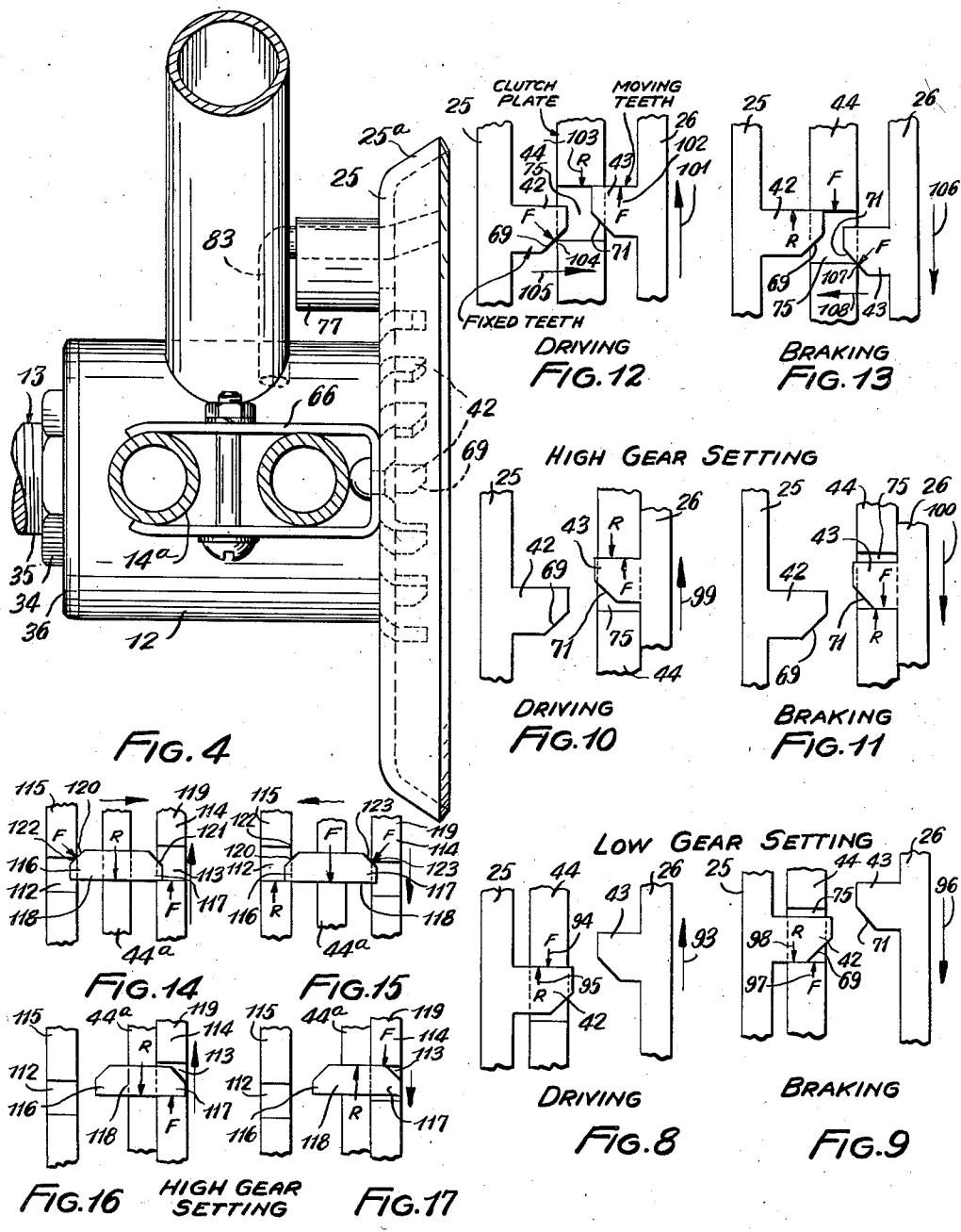

United States Patent Office 2,825,246
Patented Mar. 4, 1958

2,825,246

TWO-SPEED BICYCLE TRANSMISSION

Archer W. Richards, Chagrin Falls, Ohio

Application April 7, 1954, Serial No. 421,513

8 Claims. (Cl. 74—781)

This invention relates to multiple speed bicycle transmissions, which provides a transmission which is adapted to be used on a bicycle in combination with the conventional coaster brake, and which can be quickly and easily applied to the bicycle without requiring any alteration of the bicycle frame structure. This novel transmission is disclosed herein as being of the two-speed type and as being embodied in the pedal mounting hub or barrel of the bicycle frame, but it will be understood, of course, that various features of this transmission can also be employed in similar multiple speed transmissions intended for use at other locations on the bicycle.

An essential object of the invention is to provide a multiple speed bicycle transmission in which the connection between the pedals and the rear wheel through the transmission is such that the braking action may be applied at any time in either speed or during the speed change. The attainment of this object precludes a neutral change or non-driving condition from occurring, whereby the rider may at all times be assured of being enabled to effect the braking action.

Another object is to provide a novel multiple speed bicycle transmission for mounting, preferably as a prefabricated assembly, in the pedal crank hub of a conventional bicycle and comprising a one-piece pedal crank member insertable through such hub and having a combined clutch and gear unit thereon.

A further object is to provide such a bicycle transmission in which the pedal crank member has a journal portion on the shaft thereof, and in which hollow spline and sun gear members are movable onto such journal portion by passage over one of the pedal support arms of the pedal crank member.

Still another object is to provide a novel bicycle transmission comprising driving and driven members connected by clutch controlled gearing affording different drive ratios and in which means is provided for insuring a full engagement of the clutch in the setting thereof corresponding with the drive ratio selected by the rider.

Yet another object is to provide a novel bicycle transmission of the character just mentioned in which the clutch means comprises spaced clutch members, one of which is relatively fixed and the other of which is connected with the driven member, and a shiftable clutch member shiftable between the spaced clutch members, and in which cam means embodied in the clutch means is effective on the shiftable clutch member to insure a full engagement thereof with one only of the spaced clutch members.

As a further object, this invention provides such a novel transmission in which the spaced clutch members are annular groups of clutch teeth and the shiftable clutch member has annularly disposed clutch recesses for engagement with the groups of clutch teeth, and in which the groups of clutch teeth have cam faces thereon which are effective on the clutch plate for insuring the full engagement thereof with one only of the groups of clutch teeth.

Another object is to provide a novel transmission of the kind just above referred to in which the actuating means for the clutch includes a manually operable means for preselecting or initiating the desired shift of the clutch plate.

It is, likewise, an object of this invention to provide a novel transmission of the character above indicated in which the clutch actuating means comprises push-pull means connected with the shiftable clutch plate and responsive to a manually operable control means, and in which spring means stressed by the push-pull means causes or assists in a rapid completion of the shift which has been preselected or initiated by the manual control means.

As still another object, this invention provides a novel bicycle transmission of the kind indicated above in which the sun gear member of the gearing and the spline member of the clutch means are complemental members connected together for a simultaneous rotation on the journal portion of the pedal crank, and in which portions of such sun gear and spline members form a support bearing for rotatably supporting the driven member.

This invention further contemplates such a novel transmission in which the support bearing is formed internally of the connected spline and sun gear members by cooperating axially recessed adjacent ends thereof and includes an annular access slot, and in which the driven member has a central hub portion engaging such support bearing through the access slot.

Additionally, this invention provides such a novel bicycle transmission comprising a combined gear and clutch unit in which the gearing is of the planetary type and is housed in a gear case formed by one pair of relatively rotatable plate members and the clutch means is housed in a clutch housing formed by a second pair of relatively rotatable plate members, and in which the adjacent plate members of the two pairs are connected together to form a driven member which also constitutes a carrier for one of the gear members of the planetary gear train.

The invention can be further briefly summarized as consisting in certain novel combinations and arrangements of parts hereinafter described and particularly set out in the claims hereof.

In the accompanying sheets of drawings, forming a part of this specification:

Fig. 4 is a partial vertical section taken on section line 4—4 of Fig. 3 showing the clutch housing cover and the mounting thereof on the bicycle frame;

Figs. 8 to 13 inclusive are diagrammatic views illustrating the functioning of the clutch means under different operating conditions;

Figs. 14 and 15 are diagrammatic views similar to Figs. 12 and 13 and illustrate the functioning of a modified form of the clutch means;

Figs. 16 and 17 are diagrammatic views similar to Figs.

Figure 19:
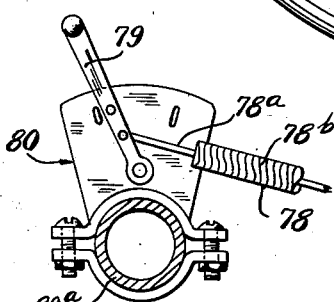

10 and 11 and illustrate a resulting full engagement of the modified clutch means;

Fig. 18 is an explanatory chart related to the diagrammatic views of Figs. 8 to 17; and Fig. 19 is an elevation showing a manual control for the clutch means.

The novel transmission 10 is shown in the drawings as being applied to a bicycle 11 by being mounted in the hollow hub or barrel 12 which rotatably supports the usual pedal crank member. The hub 12 is of a conventional or standard size and shape and forms a part of a conventional bicycle frame 14 on which it is located at the junction of the rear wheel fork 14a with the seat post member 14b. The bicycle 11 is of a conventional construction having its rear wheel equipped with a coaster brake of a conventional form.

The transmission 10 comprises a combined gear and clutch unit 10a, and a pedal crank member 13 having a journal portion 16 on which such gear and clutch unit is mounted. The gear and clutch unit 10a and the pedal crank member 13 together form a prefabricated assembly or package unit which can be readily mounted in the hub 12 of a bicycle during the initial construction thereof by insertion of the pedal crank member through such hub, or can be similarly assembled into the hub 12 of a used bicycle after the standard or existing conventional pedal crank member has been removed. When the transmission 10 has been mounted in the hub 12, it will cooperate with the coaster brake of the rear wheel through the chain 17 in such manner as to provide a plurality of drive ratios for the forward propulsion of the bicycle and also such as to utilize the existing braking means of the coaster brake.

As shown in the drawings, the transmission 10 also comprises a gear case 18 having gearing 19 therein and a clutch housing 20 having clutch means 21 therein. The gear case 18 is formed by a pair of axially spaced plate members 22 and 23, and the clutch housing 20 is formed by a pair of axially spaced plate members 24 and 25. The plate member 22 is connected with the pedal crank member 13 so as to be rotatable therewith and constitutes the driving or input member of the transmission. The adjacent plate members 23 and 24 of the two pairs of such plate members are connected together, as will be further explained hereinafter, and constitute the output or driven member 26 of the transmission. The plate member 24 is in the form of a sprocket plate having an annular group of sprocket teeth 26a formed on the periphery thereof and engaged by the chain 17.

The pedal crank member or hanger 13 is a one-piece member comprising a pair of pedal support arms 27 and 28 adapted to have conventional pedals 29 and 30 mounted thereon, and a shaft 31 extending between and integrally connecting such pedal arms. A portion of the shaft 31 is enlarged to constitute the cylindrical journal portion 16 mentioned above, by which one end of the shaft 31 is integrally connected with the pedal arm 28.

Figures 1, 6:
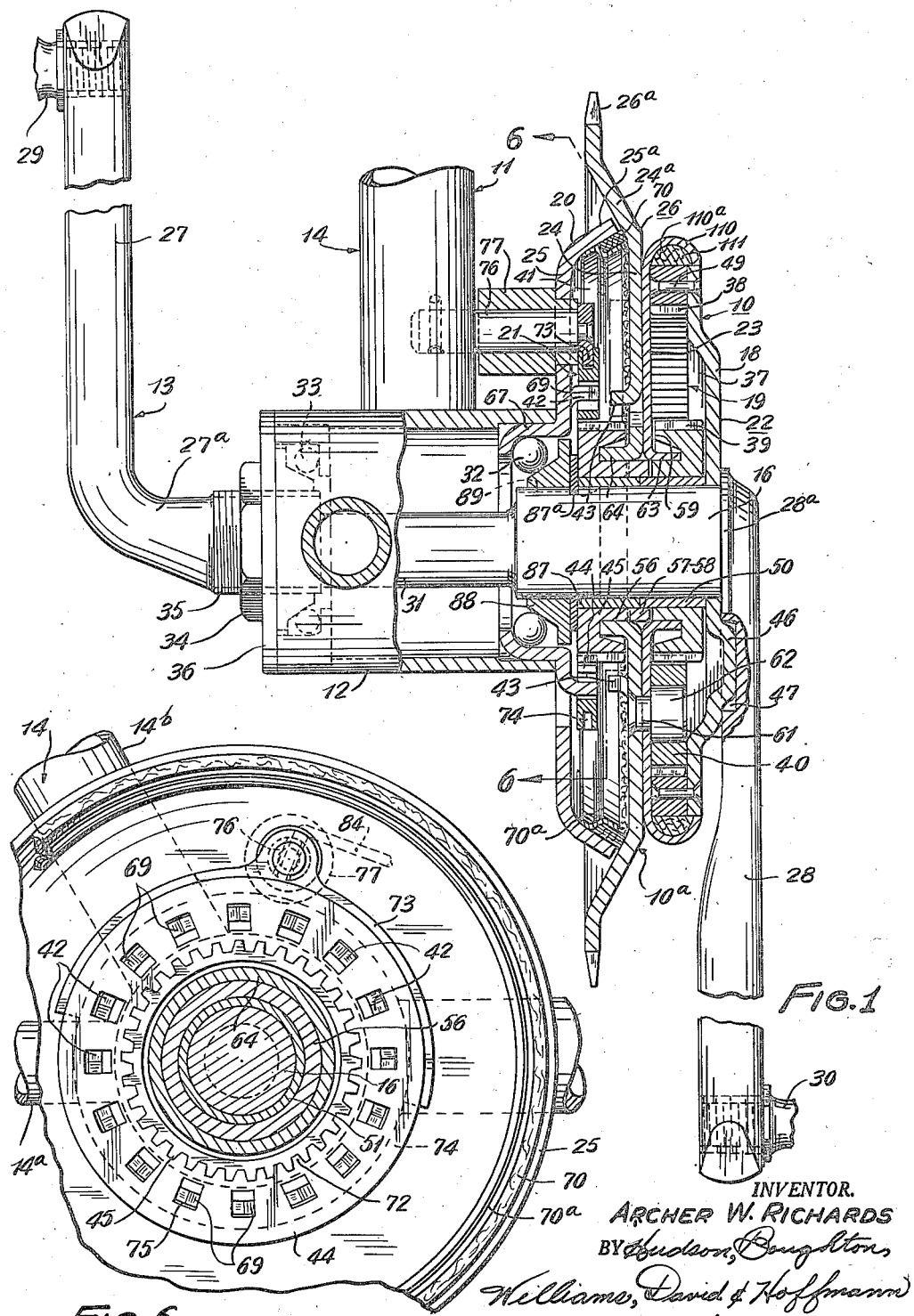
Fig. 1 is a partial vertical section taken through a transmission substantially on the hub axis thereof, as indicated by section line 1—1 of Figs. 2 and 3.
Fig. 6 is a partial transverse vertical section taken through the clutch means of the transmission as indicated by section line 6—6 of Fig. 1.
Figure 2:
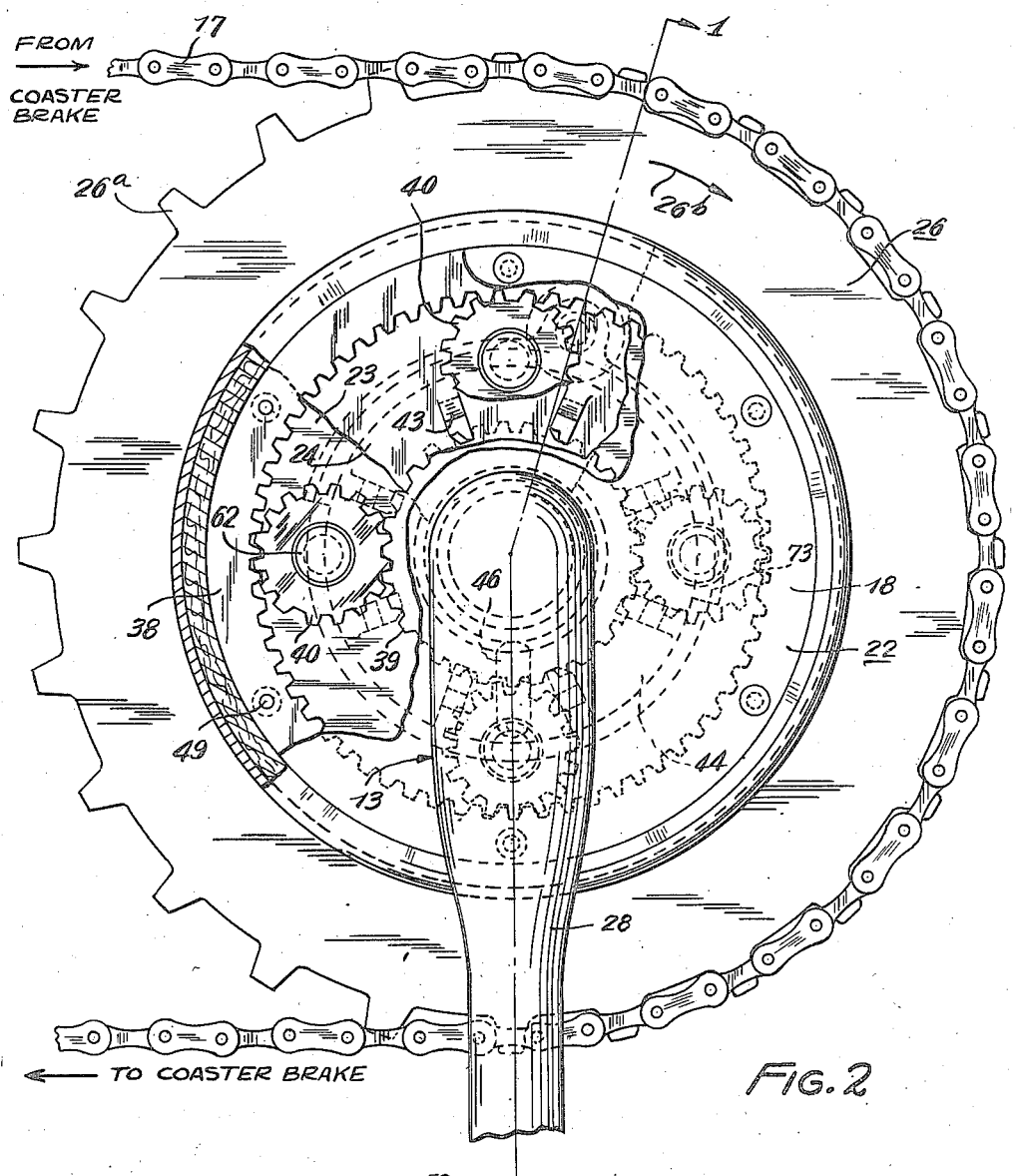
Fig. 2 is an end elevation of the gear case end of the transmission and with portions of the gear case broken away.

The pedal crank member 13 is mounted in the hub 12 with the shaft 31 extending coaxially therethrough and rotatably supported therein by a pair of axially spaced antifriction bearings 32 and 33. The shaft 31 is of a length such that the journal portion 16 will project from one end of the hub 12, as shown in Fig. 1, and constitute a support on which the gear and clutch unit 10a of the transmission is mounted. The transmission 10 is maintained in its assembled position in the hub 12 by a retaining nut 34 applied to a threaded portion 35 of the shaft 31 and engaging an end cover or bearing race 36 located at the left end of the hub, as viewed in Fig. 1.

The gearing 19 is located in the gear chamber 37 of the gear case 18 and is here shown as being of the planetary type comprising ring and sun gears 38 and 39 and a group of planet pinion gears 40 disposed between and constantly in mesh with such sun and ring gears.

The clutch means 21 is located in the clutch chamber 41 of the clutch housing 20 and comprises a pair of axially spaced clutch members 42 and 43 which, in this instance, constitute annular groups of teeth and a shiftable plate-like clutch member 44 shiftable between such annular groups of teeth. The clutch means 21 also comprises a spline member 45 on which the shiftable clutch member 44 is mounted for axial shifting, as will be further explained hereinafter.

The plate member forming the driving member 22 is a substantial circular plate member which is supported centrally thereof on the journal portion 16 and is connected with the pedal arm 28 as by means of a key portion 46 formed on this plate member and engaging in a slot or keyway 47 of such pedal arm. The driving member 22 also constitutes a carrier for the ring gear 38 which is secured to this member adjacent the periphery thereof as by means of the rivets 49.

Figure 7:
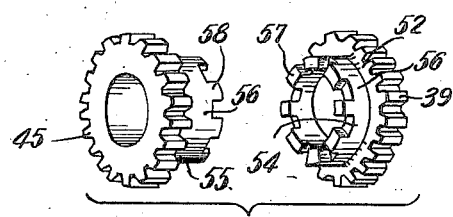
Fig. 7 is a perspective view showing the clutch spline member and the sun gear member in detached relation.
Figure 5:
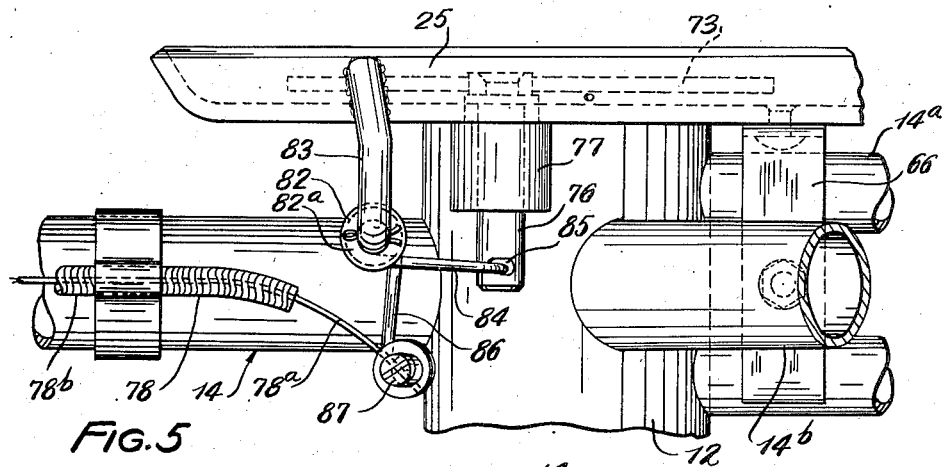
Fig. 5 is a fragmentary plan view further illustrating the clutch housing cover and the mounting thereof.
Figure 3:
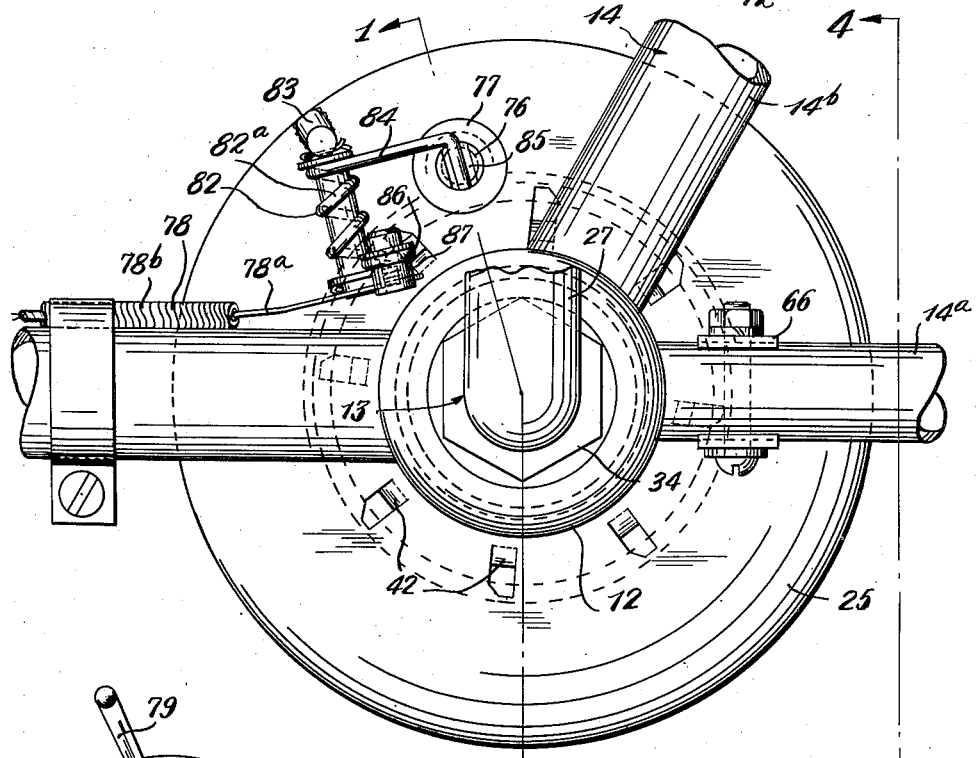
Fig. 3 is an end elevation of the clutch end of the transmission.

The sun gear 39 is a hollow gear member which is rotatably mounted on the journal portion 16 by means of an inner bushing 50. The spline member 45 of the clutch means 21 also comprises a hollow member which is substantially identical with the sun gear 39 and is rotatably mounted on the journal portion 16 by an inner bushing 51. As shown in Figs. 1 and 7, the sun gear member 39 and the clutch spline member 45 have undercut annular recesses 52 and 53 formed in the adjacent ends thereof, such that integral axial bushing portions 54 and 55 will be defined on the these members and will constitute a support bearing 56 when these members are assembled on the journal portion 16.

The adjacent ends of the bushing portions 54 and 55 are provided with annular groups of teeth 57 and 58 which are in meshed engagement and connect the sun gear member and the spline member for rotation together around the journal portion 16. The adjacent edges of the rim portions which carry the sun gear teeth and the clutch splines are spaced apart axially of the journal portion 16, when the teeth 57 and 58 are in meshed engagement as shown in Fig. 1, so as to define a substantially radial annular access slot 59 leading to the support bearing 56. From the construction just above described, it will be seen that the spline member 45 can be regarded as an extension of the gear member 39, and hence, a part of the sun gear means.

The plate member 23 of the gear casing 18 and the plate member 24 of the clutch housing 20 are disposed in back-to-back relation, as shown in Fig. 1, and are connected together by rivets 61 extending therethrough and having heads forming pivot pins 62 for the planet pinion gears 40. Any suitable number of such planet pinion gears can be provided, such as the four pinion gears 40 shown in this instance and rotatably mounted on the pivot pins 62. The connected plate members 23 and 24 forming the driven member 26 also constitute a carrier for the planet pinion gears 40.

The driven member 26 is rotatable about the journal portion 16 and is supported for such rotation by the above-described support bearing 56. For this purpose, the plate member 23 is provided with a central axial flange or sleeve portion 63, and the plate member 24 is provided with an oppositely extending central axial flange or sleeve portion 64. The axial annular flanges 63 and 64 engage the support bearing 56 through the access slot 59 and form a central hub portion on the driven member 26 by which this member is rotatably mounted on the support bearing.

The annular group of teeth 42 constitute a fixed or stationary clutch engaging means and are connected with, or carried by, the plate member 25. This plate member is held in a fixed relation by being connected with the rear fork 14a of the bicycle frame 14, as by means of the anchor bracket 66. The plate member 25 also comprises an axially projecting central cylindrical portion 67 having a press fit in one end of the hub 12 and forming an outer race for the antifriction bearing 32.

The clutch plate engaging teeth 42 are shown in this instance as being in the form of lugs constituting partially sheared integral portions of the plate member 25 which have been deflected therefrom so as to project axially into the clutch chamber 41 in surrounding relation to the spline member 45. An important feature of the teeth 42 is that they are provided with cam faces 69 on the side thereof which can be referred to as the rear or trailing side and which cam faces have an inclination approximately 45° to the axis of the journal portion 16.

As shown in the drawings, the plate members 24 and 25 of the clutch housing 20 are of a dished shape, such that the dished portions thereof cooperate in defining the clutch chamber 41. The fixed plate member 25 forms a cover plate for the clutch housing on the frame side thereof and has its inclined rim portion 25ᵃ extending toward the plate member 24, such that the inclined annular portion 24ᵃ of the latter plate member is in a relatively close running relation to such rim portion.

The joint formed between the cooperating inclined plate portions 24ᵃ and 25ᵃ can be sealed by an annular packing ring 70 which is supported by shouldered support ring 70ᵃ suitably attached to the plate member 25. The packing 70 is preferably a fibrous or absorbent ring which, in addition to excluding dust, also forms a lubricant reservoir for supplying lubricant to the moving parts of the clutch and clutch housing.

The clutch teeth 43 project into the clutch housing 41 in a spaced relation to the clutch teeth 42 and in a substantially axially opposed relation to the latter. The clutch teeth 43 are here shown as being formed on, or carried by, the plate member 24 of the driven member 26. The teeth 43 are formed by inwardly deflected lugs which have been partially sheared from the plate member 24 and are disposed in a surrounding relation to the spline member 45. An important feature of the clutch teeth 43 is that they are provided on the rear or trailing side thereof with cam faces 71 which are disposed at an inclination of approximately 45° to the axis of the journal portion 16.

The shiftable clutch member 44 is a substantially circular clutch plate, as shown in Fig. 6, and has a central opening provided with internal teeth or splines 72. This clutch plate is slidably mounted on the spline member 45 and connected therewith by the meshed engagement of the internal teeth 72 with the external teeth of the spline member. The clutch plate 44 is adapted to be shifted by means of a shift yoke 73 engaging in an annular peripheral groove 74 of the clutch plate. The clutch plate 44 is engageable with the annular groups of teeth 42 and 43 and, for this purpose, is provided with an annular group of openings or clutch recesses 75 which are accessible from opposite sides of the clutch plate for alternate engagement with the annular groups of teeth at the opposite sides thereof. As shown in the drawings, the clutch plate is of greater thickness than the width of the space between the two groups of teeth 42 and 43.

The shift yoke 73 is mounted on the inner end of a shifter shaft 76 which slidably extends into the clutch housing 41 through a bearing sleeve 77 mounted on the cover plate 25. Axial movement is imparted to the shifter shaft 76 by a push-pull means 78 which connects this shaft with the movable lever 79 of a suitable manually operable control means, such as the control means 80 shown in Fig. 19. The control means 80 is located on a readily accessible portion of the bicycle, such as on the handle bar 80ᵃ, and the lever 79 thereof is connected with the shifter shaft 76 by the push-pull means which, in this instance, is in a form of a resilient wire 78ᵃ extending through a guide tube or sheath 78ᵇ. The lever 79 is adapted to be releasably held in either of two control positions corresponding with high and low gear settings of the transmission 10.

The push-pull connecting means 78 also comprises a coil spring 82 interposed between the resilient wire 78ᵃ and the shifter shaft 76. The spring 82 has the coil portion 82ᵃ thereof pivotally mounted on a support arm 83 which is welded, or otherwise secured, to the cover plate 25 of the clutch housing. The spring 82 is in the form of a bell crank lever and has an arm 84 connected with the shifter shaft 76 by being engaged in an opening 85 of the latter. The other arm 86 of the spring 82 is connected with the wire 78ᵃ by means of the anchor member 87.

When the various parts of the clutch and gear unit 10ᵃ are assembled on the journal portion 16 of the pedal crank member 13 in the relation shown in Fig. 1, the driving member 22 will be adjacent the annular shoulder 28ᵃ of the pedal arm 28, and the inner bushings 50 and 51 will extend between this plate member and a washer 87 lying against the inner race 88 of the antifriction bearing 32. The washer 87 is provided with a lug portion 87ᵃ which engages in an axial slot or keyway 89 of the journal portion 16. The pedal crank member 13, having the gear and clutch unit 10ᵃ assembled thereon, is then inserted into the hub 12 by movement of the pedal arm 27 through the latter. The outer race 67 can now be readily pressed or drawn into the open end of the hub 12 and retained in such telescoping engagement by tightening of the nut 34 on the threaded shaft portion 35.

With respect to the operation of assembling the gear and clutch unit 10ᵃ on the pedal crank member 13, it is pointed out that all of the hollow parts of this unit can be moved into position on the journal portion 16 by being moved over and along the pedal arm 27 and the shaft 31. By making the sun gear member 39 and spline member 45 as two identical pieces, they can be economically produced as by molding or other suitable manufacturing process, and are of such relatively short axial length that they can be assembled onto the journal portion 16 by such axial movement over the arm and shaft portions 27 and 31.

This assembly procedure also applies to the inner bushings 50 and 51. These inner bushings are of an axial length in relation to the sun gear member 39 and the spline member 45, such that when clamping pressure is set up between the shoulder 28ᵃ and the nut 34, it will be applied to the inner bushings and the sun gear member and the spline member will be left relatively loose for free rotation about the inner bushings and the journal portion 16.

With respect to the pedal crank member 13, it should also be explained that the length and radius of curvature of the connecting portion 27ᵃ by which the pedal arm 27 is integrally connected with the shaft 31 are such that during the movement of the pedal crank member through the opening of the hub 12, the outer race 67 of the bearing 32 can be aligned with the open end of the hub for telescoping movement thereinto without jamming or assuming a cocked position against such open end of the hub. The radius of curvature of the connecting portion 27ᵃ is also such as to permit the inner bushings 50 and 51 and the sun gear member 39 and the spline member 45 to be readily moved thereover in being assembled onto the journal portion 16. It will also be understood that the pedal 29 is disconnected from the pedal arm 27 at the time that the pedal crank member 13 is being inserted through the opening of the hub 12.

The transmission 10, comprising the pedal crank member 13 and the clutch and gear unit 10ᵃ mounted on the journal portion 16, can be built and assembled as a factory operation so as to constitute a prefabricated assembly or package unit. Transmissions in this package unit form can be mounted in the hubs 12 of new bicycles during the manufacture thereof, or can be mounted in the hubs of previously built bicycles for converting the same to multiple gear ratio operation. Since the transmission 10 is directly applicable to hubs 12 which are of a conventional standard size, no structural changes will need to be made for adapting the bicycles to receive this transmission.

When the clutch plate 44 is in engagement with the stationary teeth 42, as shown in Fig. 1, it will be held against rotation by these clutch teeth and will also hold the spline member 45 against rotation by reason of its splined connection with the latter. At this time, the sun gear 39 will also be held against rotation by the clutch plate and the spline member 45 by reason of the meshed engagement of the sun gear with the latter. Rotation imparted to the ring gear 38 by the driving member 22, while the sun gear 39 is thus held relatively fixed, will cause the ring gear to roll the planet pinion gears 40 around the sun gear. The driving of the planet pinion gears in this manner by the ring gear 38 will cause the driven member 26 of the transmission to be driven at the low-gear ratio provided by the gearing. The resulting low speed forward rotation of the driven member 26, as indicated by the arrow 26$^b$, will cause the sprocket 26$^a$ to transmit such low speed forward rotation to the coaster brake unit of the rear wheel through the chain 17.

When the clutch plate 44 is disengaged from the stationary or fixed teeth 42 and shifted into engagement with the clutch teeth 43, the transmission 10 will operate in its high-gear ratio which, in this instance, is a direct drive or unit ratio setting. At this time the clutch plate 44 connects the driven member 26 with the spline member 45 and the sun gear 39 so as to prevent relative rotation between the driven member and the sun gear. As the result of such a locked relationship between the driven member 26 and the sun gear 39, the planet pinion gears 40 will prevent relative rotation between the sun gear and the ring gear 38. Under these circumstances, the planetary gearing 19 will be in a so-called "locked-up" condition and the torque applied to the ring gear 38 will then be transmitted directly through the locked planet pinion gears 40 to the driven member 26 which, in turn, will transmit the torque to the coaster brake unit of the rear wheel through the sprocket 26$^a$ and the chain 17.

The cam means provided by the cam faces 69 and 71 of the teeth 42 and 43 is an important feature of the clutch means 21 and will now be described in conjunction with the diagrammatic views of Figs. 8 to 13, inclusive, and the chart of Fig. 14. The low-gear setting for the clutch plate 44 is shown in Figs. 8 and 9, of which Fig. 8 represents the forward driving condition of the transmission 10, and Fig. 9 illustrates the braking condition.

When the clutch plate 44 has been shifted into engagement with the fixed teeth 42 for the low-gear setting, and the driven member 26 is being rotated in a forward direction as represented by the large arrow 93, the reaction force of the driving effort will be effective through the sun gear 39 and the spline member 45 and will tend to rotate the clutch plate 44 in a reverse direction and to apply a rotative force relative to the stationary teeth 42 in the direction represented by the small arrow 94. This tendency of the clutch plate to rotate in a backward direction is resisted by the fixed teeth 42, as represented by the small arrow 95.

Fig. 9 shows the braking action being carried out when the transmission 10 is in its low-gear setting, that is, with the stationary plate in engagement with the clutch teeth 42. The brake actuating force is applied to the driven member 26 through the planetary gear train without need for shifting out of the low-gear setting and causes rotation of the driven member and sprocket in a backward direction, as represented by the arrow 96. The application of this braking force causes a reaction force to be transmitted through the sun gear 39 and the spline member 45 to the clutch plate 44, tending to rotate the latter in a forward direction and to apply a force to the fixed teeth 42 in the direction represented by the small arrow 97. The tendency of the clutch plate 44 to rotate in the forward direction is resisted by the fixed teeth 42 with a resistance force represented by the small arrow 98.

Figs. 10 and 11 illustrate the operation of the transmission 10 in its high-gear setting with Fig. 10 showing the forward driving condition in which the clutch plate 44 is in engagement with the clutch teeth 43 of the driven member 26. Fig. 11 illustrates the braking condition in the high-gear setting during which the clutch plate 44 is in engagement with the clutch teeth 43 of the driven member 26.

In the high-gear setting, the engagement of the clutch plate 44 with the clutch teeth 43 produces the above-described locked-up condition of the planetary gearing. Thus in the forward driving condition of Fig. 10, the clutch plate 44 and the driven member 26 will rotate together in the forward direction as represented by the large arrow 99. Similarly in the braking condition in Fig. 11, the clutch plate 44 and the driven member 26 will rotate together in the backward direction in response to a back-pedaling of the pedal crank member 13, as represented by the large arrow 100.

During shifting of the clutch plate 44 toward its high-gear setting, it may, at times, move into only a partial engagement with the clutch teeth 43, as represented in Fig. 12. When this condition occurs, the clutch plate will be in an intermediate or straddling position in which it is partially in engagement with the clutch teeth 43 and also partially in engagement with the fixed teeth 42. It is in connection with this intermediate position of the clutch plate 44 that the cam means provided by the cam faces 69 and 71 is of extreme importance because it prevents the occurrence of a situation in which the rider of the bicycle might be temporarily unable to actuate the driven member 26 in either its forward direction for forward travel, or its reverse direction for braking action.

When the clutch plate 44 occupies this intermediate position during the forward driving condition of the transmission 10, as illustrated in Fig. 12, the forward direction of rotation of the driven member 26 is illustrated by the large arrow 101 and at this time, the teeth 43 will apply a rotation force to the clutch plate 44 in a forward direction, as represented by the small arrow 102. The resistance of the clutch plate to being rotated in this forward direction is represented by the small arrow 103. This rotation of the clutch plate 44 in the forward direction by the teeth 43 causes the corner 104 of the rear side of each of the clutch recesses 75 to engage one of the cam faces 69 of the fixed teeth 42.

The resulting camming action of the cam faces 69 on the clutch plate 44 causes the latter to be shifted toward the right, as represented by the large arrow 105, thereby moving the clutch plate into the desired full engagement with the clutch teeth 43. This action of the cam faces 69 results in a final position of the clutch plate corresponding with that shown in Fig. 10 in which it is fully engaged with the fixed teeth 43 and completely disengaged from the clutch teeth 42.

If the operating condition should be such that when the rider applies a back-pedaling force to the pedal crank member 13 for causing braking while the clutch plate 44 is in the above-mentioned straddling or intermediate position, the driven member 26 will then be moving in a backward direction, as represented by the large arrow 106 of Fig. 13. The cam means provided by the cam faces 69 and 71 prevents this intermediate position of the clutch plate from interfering with the accomplishment of the braking action by automatically applying a shifting force to the clutch plate.

Thus, as shown in Fig. 13, the backward rotation of the driven member 26 causes the cam faces 71 of the clutch teeth 43 to engage the corners 107 of the trailing sides of the clutch recesses 75 and apply a camming action to the clutch plate. This results in a shifting of the clutch plate 44 toward the left, as represented by the large arrow 108, causing the clutch plate to move into full engagement with the fixed teeth 42. The complete disengagement of the clutch plate from the clutch teeth 43 thus leaves the driven member 26 free to be rotated in the backward direction to accomplish the desired braking action.

In the shifting of the clutch between the high- and low-gear settings, a movement of the control lever 79 in a direction to apply a pulling force to the spring arm 86 through the wire 88a, will tend to shift clutch 44 toward the left and into engagement with the fixed teeth 42. This movement of the control lever 79 preselects or initiates the low-gear shift of the clutch plate 44 and causes a stressing or loading of the spring 82. If the rotative position of the clutch plate at this time should happen to be such that the clutch plate engages the tops of the teeth 42, or if a driving or braking force is then being applied by the operator, the clutch plate will be temporarily prevented from shifting into engagement with the fixed teeth 42.

The preselecting or initiating of the desired shift by the movement of the lever 79, causes energy to be stored in the spring 82 particularly when the clutch plate is temporarily prevented from moving into the desired gear setting, but as soon as the clutch recesses 75 come into alignment with the fixed teeth 42, or the clutch plate is released by the discontinuance of the driving or braking action, the clutch plate will be smoothly and quickly shifted by the force of the spring into a position of full engagement with the teeth 42.

When the rider wishes to shift to the high-gear setting of the transmission, the control lever 79 is moved in the opposite direction to transmit a pushing force through the wire 78a and through the spring 82 to the clutch plate, tending to shift the latter toward the right into engagement with the clutch teeth 43. During this shift, the occurrence of a condition which temporarily prevents the clutch plate 44 from being moved into engagement with the clutch teeth 43, will not prevent the operator from actuating the control lever in the proper direction for preselecting or initiating the desired shift and which actuation of the control lever results in a stressing or loading of the spring 82 in the manner and for the same purpose as has already been explained above. When the condition temporarily preventing the desired shifting of the clutch plate 44 is removed, the force of the spring 82 will quickly and smoothly move the clutch plate into full engagement with the clutch teeth 43.

From the functions which have been described above for the cam faces 69 and 71 of the clutch means and for the spring 82, it will be seen that the desired shift can be initiated or preselected by the rider at any time without interruption of the driving or braking action and that the completion of the shift will be quickly and smoothly accomplished as soon as the conditions are correct for the completion of the desired shift. It will thus also be seen that the cam means insures an automatic shifting of the clutch plate into full engagement with one set only of the clutch teeth, such that a straddling position of the clutch plate, which would interfere with, or prevent, either a driving or braking action, is definitely prevented.

The plate member 23 of the gear case 18 is provided with a rounded peripheral portion forming a hollow annular rim 110 which overhangs the peripheral edge or rim of the plate member 22 and is in a relatively close running relation to the latter. The annular recess 110a of the hollow rim 110 forms a sealing chamber in which a suitable packing 111 is located, such as a fibrous and absorbent packing ring which excludes dust from the gear chamber 37 and is also adapted to contain lubricant to be fed therefrom to the relatively movable parts of the gearing and gear case.

The construction and operation described above for the clutch means 21 contemplates that the clutch teeth are associated with the spaced clutch members and that the clutch recesses are located on the clutch plate 44. In Figs. 14 to 17 a modified construction is shown in which the clutch teeth are on a shiftable clutch plate 44a and annular groups of clutch teeth engaging recesses 113 and 112 are provided in plate members 114 and 115 corresponding with the above-described plate members 24 and 25. The clutch teeth comprise annular groups of teeth 116 and 117 formed by opposite ends of clutch pins 118a which are mounted on and extend through the clutch plate 44a. The plate member 114 constitutes a driven member 119 corresponding with the above-mentioned driving member 26.

In this modified construction of Figs. 14 to 17, the clutch teeth 116 and 117 are provided with cam faces 120 and 121 on the forward or leading side thereof. The clutch pins 118 are of greater length than the axial spacing of the groups of teeth engaging recesses 112 and 113, such that if the clutch plate 44a assumes an intermediate or partially shifted position, the cam faces 120 and 121 will be effective to automatically cause a completion of the shift and will result in a full engagement of the clutch plate.

Thus in Fig. 14 representing the driving condition of the modified form of transmission, the forward rotation of the driven member 119 imparts a forward rotation to the clutch plate 44a causing the cam face 120 to wedgingly engage the corner 122 of the plate member 115 and resulting in the clutch plate being shifted toward the right into a full engagement with the clutch recesses 113, as shown in Fig. 16. Similarly, during the braking condition represented in Fig. 15 the reverse rotation of the driven member 119 causes the corner 123 of the plate member 114 to act on the cam face 121. This results in the clutch plate 44a being automatically shifted into a full engagement with the clutch recesses 112, as shown in Fig. 17.

From the accompanying drawings and the foregoing detailed description, it will now be readily understood that this invention provides a multiple speed bicycle transmission which comprises a relatively small number of parts adapted to be economically manufactured and assembled. It will now also be understood that this novel transmission is adapted to be constructed in the shop as a prefabricated assembly or package unit to be installed as such in either a bicycle under construction or in a bicycle undergoing conversion to a multiple speed transmission. Additionally it will now be understood that in the novel transmission the cam means of the clutch members will at all times so function that it is impossible for the shiftable clutch member to become detached from its coacting elements in one position, before it becomes at the same time effectively drivingly connected with its opposite coacting members. Therefore, there can be no neutral position in which relative motion of the driving and driven members would result in holding the clutch in the dangerous, non-braking position.

Also, from the foregoing description it will be seen that this transmission is capable of being economically manufactured. As a transmission, its efficiency is high. The gear-shifting accomplished by the acton of a spring-loaded shifting clutch lever affords convenient and effective change of speed. There is no "free-wheeling" clutch position, and there can be no locked engagement during shifting from one speed to another. The transition may be termed "synchromatic," and at no time in the operation or shifting can the braking be lost.

Having thus described my invention, I claim:

1. In a bicycle transmission; a fixed hollow hub; a drive crank having a shaft portion rotatably mounted in said hub and including a journal portion projecting from one end of said hub; a first pair of relatively rotatable plate members surrounding said journal portion and defining a gear case; planetary gearing in said gear case comprising a ring gear, a sun gear mounted for rotation on said journal portion and planet pinion gears disposed between and meshing with said ring and sun gears; one plate member of said first pair being a cover plate and a carrier for said ring gear and being connected with said crank to be rotated thereby; a second pair of relatively rotatable plate members surrounding said journal portion and defining a clutch housing; one plate member of said second pair being a fixed cover plate; the adjacent plate members of such first and second pairs being secured together and constituting a driven member and a carrier for said planet pinion gears; annular groups of teeth projecting axially into said clutch housing and carried respectively by the plate members of said second pair; a spline member mounted on said journal portion for rotation in said clutch housing and being connected with said sun gear; and a clutch plate mounted on said spline member for axial shifting in said clutch housing between said groups of teeth; said clutch plate having annularly disposed recesses engageable with said groups of teeth.

2. A transmission as defined in claim 1 in which the pairs of plate members have outer annular portions in relatively close running cooperation and forming closures for said gear case and clutch housing; and in which absorbent packing members located on said gear case and clutch housing adjacent said closures form dust seals and lubricant reservoirs.

3. In a bicycle transmission; a fixed hollow hub; a drive crank having a shaft portion rotatably mounted in said hub and including a journal portion projecting from one end of said hub; a first pair of relatively rotatable plate members surrounding said journal portion and defining a gear case; planetary gearing in said gear case comprising a ring gear, a sun gear mounted for rotation on said journal portion and planet pinion gears disposed between and meshing with said ring and sun gears; one plate member of said first pair being a cover plate and a carrier for said ring gear and being connected with said crank to be rotated thereby; a second pair of relatively rotatable plate members surrounding said journal portion and defining a clutch housing; one plate member of said second pair being a fixed cover plate; the adjacent plate members of such first and second pairs being secured together and constituting a driven member and a carrier for said planet pinion gears; annular groups of teeth projecting axially into said clutch housing and carried respectively by the plate members of said second pair; a spline member mounted on said journal portion for rotation in said clutch housing and being connected with said sun gear; a clutch plate mounted on said spline member for axial shifting in said clutch housing between said groups of teeth positioned at opposite sides of the clutch plate; said clutch plate having annularly disposed recesses engageable with said groups of teeth; and shift means extending into said clutch housing through said fixed cover plate and engaging said clutch plate; said annular groups of teeth having cam faces thereon and the cam faces on each group of teeth being so sloped that upon partial engagement of either group of teeth with the clutch plate recesses a slight relative rotative movement between the clutch plate and the engaged teeth causes axial movement of the clutch plate to bring its recesses into substantially full engagement with the opposite annular group of teeth.

4. A multiple speed transmission for a bicycle having a coaster brake, said transmission including a planetary gear train having a plurality of elements comprising an internal gear, a sun gear, and a planetary gear intermeshing with said internal and sun gears, and means for locking the planetary gear train against relative motion for direct drive and for holding the sun gear permitting driving through the gear train, said means including a rotatable axially shiftable element having a plurality of shoulders, a coacting shoulder at each of opposite sides of the shiftable element, one of which coacting shoulders is connected with an element of the gear train to lock the gears of the gear train against relative motion, and the other of said coacting shoulders being stationary, and means for connecting the stationary coacting shoulder within the sun gear through said shiftable element for change speed drive, said coacting shoulders and the shoulders engaged thereby on the shiftable element being relatively beveled to effect completing of the shifting movement of the shiftable element and being of such extent as to effect a simultaneous engagement of the coacting shoulders with a shoulder on the shiftable element during its shifting movement.

5. The transmission defined in claim 4 including a manually operable control means connected with the rotatable axially shiftable element and including a spring adapted to be stressed in response to actuation of said control means to initiate the shifting movement, the completion of which movement is effected by camming action of the bevel of the engaging shoulders.

6. The transmission defined in claim 4 including a bearing on which the sun gear is rotatable, and including a splined member non-rotatably connected with the sun gear and with which said rotatable axially shiftable element has an interfitting spline connection, said splined member and sun gear having annular coaxial undercut portions shaped to provide a cylindrical bearing surface, and the transmission being provided with a rotatable element carrying said planetary gear of the gear train, and which latter element has a flange forming a bearing rotatable in said undercut portions and on said bearing surface.

7. The bicycle transmission defined in claim 1 in which the splined member, mounted on said journal portion and connected with the sun gear, and the sun gear are provided with adjacent communicating annular undercut recesses, the inner surfaces of which recesses provide a bearing; and in which said adjacent plate member of the first and second pairs constituting the carrier for said planet pinion gears are flanged and rotatably fitted to and supported on said bearing surfaces.

8. A multiple speed transmission for a bicycle having a coaster brake, said transmission including a planetary gear train having a plurality of elements comprising an internal gear, a sun gear, a planetary gear intermeshing with said internal and sun gears, and means for locking the elements of the planetary gear train against relative motion for direct drive and for releasing said gearing and for holding the sun gear while permitting driving through the gear train, said means including two oppositely spaced annular groups of shoulders and a rotatable axially shiftable clutch element between said groups of shoulders and having a splined connection with one gear of the planetary gear train, and said shiftable element having annularly spaced shoulders shiftable into engagement with either of said first-named groups of shoulders, one of said first-named groups of shoulders being rigidly mounted and the other of said groups of shoulders being rotatable with the clutch element when engaged thereby to prevent relative rotation of the gears, and cam means formed on the surfaces of said shoulders, and said cam means being of such extent with relation to the shifting movement of the clutch element through its intermediate position as to maintain engagement with one of said first-named annular groups of shoulders until engagement of the clutch element with the opposed first-named annular group of shoulders is effected, and whereby such cam means may act to assist the shifting movement of the axially shiftable clutch element.

(References on following page)

References Cited in the file of this patent

UNITED STATES PATENTS

| | | |
|---|---|---|
| 313,863 | Hadley | Mar. 17, 1885 |
| 680,725 | McCollam | Aug. 20, 1901 |
| 1,234,572 | Runner | July 24, 1917 |
| 2,371,564 | Wemp | Mar. 13, 1945 |
| 2,384,448 | Banker | Sept. 11, 1945 |
| 2,428,337 | Munschauer | Sept. 30, 1947 |
| 2,630,025 | Lapsley | Mar. 3, 1953 |

FOREIGN PATENTS

| | | |
|---|---|---|
| 183,102 | Switzerland | Mar. 15, 1936 |
| 352,834 | France | Aug. 22, 1905 |
| 796,594 | France | Apr. 10, 1936 |